US007511713B2

(12) United States Patent
Sadanand et al.

(10) Patent No.: US 7,511,713 B2
(45) Date of Patent: Mar. 31, 2009

(54) METHOD AND APPARATUS FOR HIGH RATE CONCURRENT READ-WRITE APPLICATIONS

(75) Inventors: Satheesh Sadanand, Bangalore (IN); Mini Jain, Bangalore (IN); Ambudhar Tripathi, Bangalore (IN); Sriram Sethuraman, Bangalore (IN)

(73) Assignee: Ittiam Systems (P) Ltd., Bangalore, Karnataka (IN)

( * ) Notice: Subject to any disclaimer, the term of this patent is extended or adjusted under 35 U.S.C. 154(b) by 748 days.

(21) Appl. No.: 11/011,921

(22) Filed: Dec. 14, 2004

(65) Prior Publication Data

US 2005/0195203 A1 Sep. 8, 2005

Related U.S. Application Data

(60) Provisional application No. 60/549,700, filed on Mar. 2, 2004.

(51) Int. Cl.
*G06F 13/00* (2006.01)
*G09G 5/399* (2006.01)
*G09G 5/36* (2006.01)

(52) U.S. Cl. ........................ 345/536; 345/537; 345/539; 345/540; 345/545; 345/547

(58) Field of Classification Search ................. 345/536, 345/539, 540, 545, 546, 547
See application file for complete search history.

(56) References Cited

U.S. PATENT DOCUMENTS 4,888,795 A * 12/1989 Ando et al. .............. 348/14.14
4,921,334 A * 5/1990 Akodes ....................... 345/89
5,388,208 A * 2/1995 Weingartner et al. ........ 345/544
5,442,371 A * 8/1995 Miller et al. .................. 345/98
5,450,549 A * 9/1995 Casparian .................. 345/556
5,519,413 A * 5/1996 Thomas et al. .............. 345/540

(Continued)

OTHER PUBLICATIONS

The IEEE Standard Dictionary of Electrical and Electronics Terms, Sixth Edition IEEE Std 100-1996 (Standard Approved Dec. 10, 1996).*

*Primary Examiner*—Jin-Cheng Wang
*Assistant Examiner*—Jacinta Crawford
(74) *Attorney, Agent, or Firm*—Prakash Nama; Global IP Services, PLLC

(57) ABSTRACT

The proposed technique provides simultaneous read and writes from a display controller using low-cost SDRAMs. This is achieved, in one example embodiment, by receiving a sequence of video frames at a first variable frame rate. A first video frame is then written in a first single-ported memory. The first video frame is then read from the first single-ported memory upon completing the writing of the first video frame in the first single-ported memory. The reading of the first video frame is then repeated from the first single-ported memory to maintain a second frame rate. The second frame rate is higher than the first variable frame rate. A second video frame is then written in a second single-ported memory upon completing the writing of the first video frame in the first single-ported memory such that the writing of the first video frame and the second video frame is at the first variable frame rate. The second video frame is then read from the second single-ported memory upon completing the writing of the second video frame in the second ported memory. The reading of the second video frame is then repeated from the second single-ported memory to maintain the second frame rate.

18 Claims, 3 Drawing Sheets

U.S. PATENT DOCUMENTS

| | | | | |
|---|---|---|---|---|
| 5,543,824 | A * | 8/1996 | Priem et al. | 345/539 |
| 5,625,386 | A * | 4/1997 | Howard et al. | 345/540 |
| 5,663,910 | A * | 9/1997 | Ko et al. | 365/189.05 |
| 5,742,788 | A * | 4/1998 | Priem et al. | 711/110 |
| 5,901,100 | A * | 5/1999 | Taylor | 365/219 |
| 6,009,036 | A * | 12/1999 | Takasugi | 365/230.01 |
| 6,054,980 | A * | 4/2000 | Eglit | 345/204 |
| 6,101,620 | A * | 8/2000 | Ranganathan | 714/718 |
| 6,222,589 | B1 * | 4/2001 | Faroudja et al. | 348/448 |
| 6,271,866 | B1 * | 8/2001 | Hancock et al. | 345/544 |
| 6,307,565 | B1 * | 10/2001 | Quirk et al. | 345/554 |
| 6,314,047 | B1 * | 11/2001 | Keay et al. | 365/230.05 |
| 6,611,260 | B1 * | 8/2003 | Greenberg et al. | 345/204 |
| 6,798,420 | B1 * | 9/2004 | Xie | 345/554 |
| 6,903,733 | B1 * | 6/2005 | Greenberg et al. | 345/204 |
| 2001/0017631 | A1 * | 8/2001 | Oakley | 345/660 |
| 2002/0021364 | A1 * | 2/2002 | Asada et al. | 348/312 |
| 2002/0050959 | A1 * | 5/2002 | Buckelew et al. | 345/55 |
| 2002/0073280 | A1 * | 6/2002 | Ng | 711/120 |
| 2002/0154658 | A1 * | 10/2002 | Song | 370/503 |
| 2003/0038807 | A1 * | 2/2003 | Demos et al. | 345/473 |
| 2003/0202119 | A1 * | 10/2003 | Masters | 348/441 |

* cited by examiner

METHOD AND APPARATUS FOR HIGH RATE CONCURRENT READ-WRITE APPLICATIONS

RELATED APPLICATION

Benefit is claimed under 35 U.S.C. 119(e) to U.S. Provisional Application Ser. No. 60/549,700, entitled "A Low cost apparatus for high rate concurrent read-write applications" by Satheesh Sadanand et al., filed Mar. 2, 2004, which is herein incorporated in its entirety by reference for all purposes.

FIELD OF THE INVENTION

This invention relates to display controllers, and more specifically to scan rate converters for progressive display controllers.

BACKGROUND OF THE INVENTION

Generally, CRT (Cathode Ray Tube) displays and LCDs (Liquid Control Displays) used in personal computers (PCs) and projectors can require frame refresh rates of more than 60 Hz to produce a flicker-free image. In a system where frames are produced at a rate lower than 60 Hz or their inherent pixel clock runs at a rate lower than the pixel clock rate required for a 60 Hz VGA (Video Graphics Adapter) display or a higher resolution display, a separate display controller, which includes a scan rate converter may be required to buffer the input and perform the required rate conversion for the output. The buffer is generally required to perform the temporal interpolation between frames during the scan rate conversion.

This type of buffering especially requires dual-ported memories as they perform simultaneous read (from the source) and write (to the display or digital-to-analog converter) operations. For example, to obtain a high resolution display, such as VGA, SVGA (Super Video Graphics Adapter), XGA (Extended Graphics Array), UXGA (Ultra Extended Graphics Array), and so on, the amount of buffer memory, i.e., the dual ported memory, required can be as much as 600 KB or higher to store a VGA frame and can be as much as 1.5 MB or higher for XGA frame. Typically, single chip dual-ported memories are limited to about 0.5 MB. Therefore, to realize such a display controller significantly higher cost memories may be required. In addition, additional control circuitry is required to manage multiple single chip dual-ported memories for high resolution display, which can increase complexity and chip area.

SUMMARY OF THE INVENTION

According to a first aspect of the invention, there is provided a method to convert incoming data at a lower rate to a higher rate, the method including the steps of receiving a sequence of video frames at a first frame rate, writing a first video frame in a first single-ported memory, reading the first video frame from the first single-ported memory upon completing the writing of the first video frame in the first single-ported memory, repeating the reading of the first video frame from the first single-ported memory to maintain a second frame rate, wherein the second frame rate is higher than the first frame rate, writing a second video frame in a second single-ported memory upon completing the writing of the first video frame in the first single-ported memory such that the writing of the first video frame and the second video frame is at the first frame rate, reading the second video frame from the second single-ported memory upon completing the writing of the second video frame in the second single-ported memory, and repeating the reading of the second video frame from the second single-ported memory to maintain the second frame rate.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

The present invention provides a low-cost high refresh rate display controller, which uses an FPGA (field programmable gate array) and single-ported memories, to convert incoming data at a lower rate to a higher rate. The display controller uses a pair of single-ported memories to perform the frame rate conversion by substantially simultaneously reading data from a source and writing data to a destination device.

Figure 1:
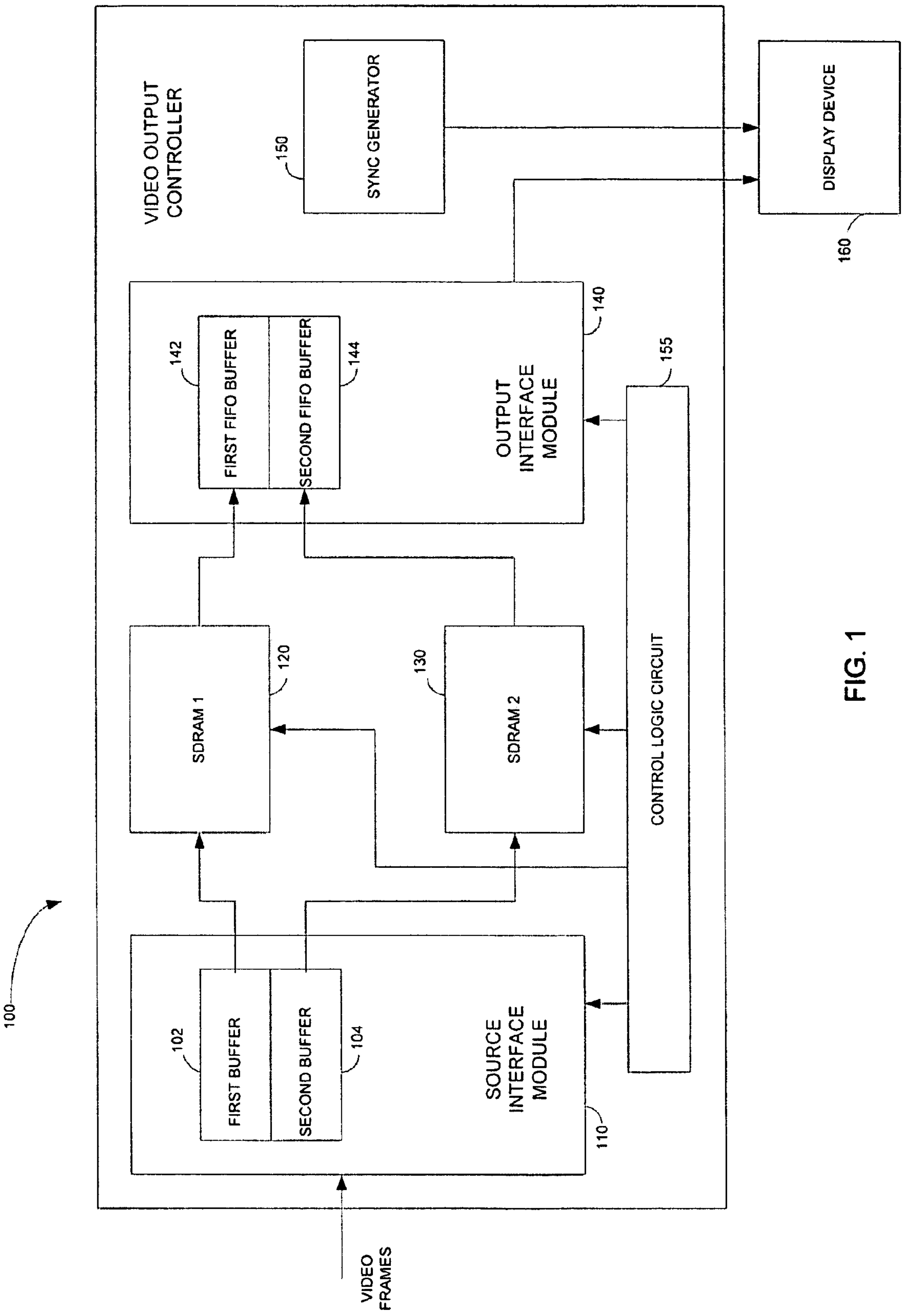
FIG. 1 is a block diagram illustrating an example display controller according to an embodiment of the present invention.

Referring now to FIG. 1, there is illustrated an example embodiment of a video output controller 100 according to the present invention. The video output controller 100 includes a source interface module 110, first and second single-ported memories 120 and 130, respectively, an output interface module 140, a sync generator 150, a control logic circuit 155, and a display device 160. As shown in FIG. 1, the source interface module 110 includes first and second buffers 102, and 104, respectively. Also as shown in FIG. 1, the output interface module 140 includes first and second FIFO (first-in/first-out) buffers 142 and 144, respectively.

In operation, in one example embodiment, the source interface module receives video frames from a source at a first frame rate, N frames per second for a VGA resolution. Each of these video frames has video data. The video data has multiple words. The control logic circuit 155 controls reading of the received video frames from the source interface module 10 at a first frame rate. Further, the control logic circuit 155 controls writing of the read video frames from the source interface module to the first and second single-ported memories at the first frame rate.

In some embodiments, the control logic circuit 155 controls writing of the multiple words by the source interface module 110 such that a predetermined number of words are read from the multiple words received in each video frame and written to one of the first and second buffer memories 102 and 104, respectively, while the other one of the first and second buffer memories 102 and 204 are being written to one of the first and second single-ported memories 120 and 130, respectively, at the first frame rate.

In some embodiments, the predetermined length of each of the first and second buffers is 8 words. The control logic circuit 155 controls the writing of the multiple words in the video data of each frame to the first and second buffers 102 and 104 such that each time one of the first and second buffers 102 and 104 is full the contents are transferred to one of the available first and second single-ported memories 120 and 130, respectively. A ping-pong scheme is employed by the control logic circuit 155, i.e., when one of the first and second buffers 102 and 104 is being written by the source interface module 110 the other of the first and second buffers 102 and 104 is transferred to the one of the available first and second single-ported memories 120 and 130 and vice-versa to maintain the video data transfer rate at the first frame rate. The single ported memories can include memory such as SDRAMs, SRAMs, and other such memories.

In some embodiments, once a video source transfers an entire current video frame into the source interface module 110, the control logic circuit 155 controls such that the transferred current video frame is written into one of the SDRAMs using the above described scheme. In these embodiments, an interrupt is raised to the source to indicate the completion of the current video frame transfer. This process repeats itself for a next video frame transferred by the video source. The event of raising the interrupt can be used internally by the control logic circuit 155 to generate a sdram_sel (SDRAM select) signal that can be used to switch the roles of the first and second single-ported memories 120 and 130, i.e., either one of the first and second single-ported memories 120 and 130 that is just written with a complete video frame will be switched to a read mode and the other one of the first and second single-ported memories 120 and 130 that was being read by the output interface module 140 will be switched to a write mode. The advantage of such a scheme is that the first frame rate need not be predetermined, but can be controlled by the video source. To maintain the integrity of the outputted video frames by the output source module 140, the control logic circuit 155 can be designed to ensure that the switching between the first and second single-ported memories 120 and 130 take place substantially around the frame boundaries.

The control logic circuit 155 also controls reading of the video frames from the first and second single ported memories 120 and 130 by the output interface module 140 and the writing of the read video frames to the output interface module 140 at a second frame rate, which is higher than the first frame rate. The control logic circuit 155 controls the reading and the writing of the video frames by the output interface module 140 such that a read current video frame from the one of the first and second single ported memories 120 and 130 is repeated R times, in the output interface module 140 while the other one of the first and second single ported memories 120 and 130, respectively, is being written with a next video frame to maintain the second frame rate. Since the second frame rate is higher than the first frame rate, the rate conversion is essentially achieved by repeating the video frames arriving at the first frame rate, R times, where R is the repetition ratio. In these embodiments, the repetition ratio is computed using the equation:

$$\text{Repetition ratio } R = (\text{second frame rate}/\text{first frame rate})$$

Wherein the frame rate can be in frames per unit time, such as frames per second.

In some embodiments, the output interface module 140 writes a segment of the current video frame, read from either one of the first and second single-ported memories 120 and 130, to either one of the first and second FIFO buffers 142 and 144 while the other one of the first and second FIFO buffers 142 and 144 is outputting a previous segment of the video frame to the display device 160. The sync generator 150 generates a Hsync (horizontal synchronization) signal and a Vsync (vertical synchronization) signal that define video line and video frame boundaries, respectively. In these embodiments, upon completion of writing the current video frame in either one of the first and second single-ported memories 120 and 130 the written video frame is read into one of the first and second FIFO buffers 142 and 144 on a line-by-line basis.

In these embodiments, the sync generator 150 generates the Hsync and Vsync signals and active video signals that are used to drive the output interface module 140 and the display device 160. The display device 160 then receives the outputted video frame data along with the Hysnc and Vsync signals from the sync generator 150 and displays the video frame data.

The display process can consist of reading from one of the first and second single-ported memories 120 and 130 into either one of the first and second FIFO buffers 142 and 144. The first and second FIFO buffers 142 and 144 may be sized to store about one line each of the video data. The first and second FIFO buffers 142 and 144 may sized about a fraction and/or multiple of each line of the video data. The first and second FIFO buffers 142 and 144 can be designed such that one pixel of video data is outputted during each pixel clock cycle. The first and second FIFO buffers 142 and 144 are controlled by the control logic circuit in a ping-pong arrangement to read the video data from either one of the first and second single-ported memories 120 and 130 and write the read data to either one of the first and second FIFO buffers 142 and 144 to maintain the second frame rate. This is accomplished by transferring a current video frame data stored in one of the first and second FIFO buffers 142 and 144 to the display device 160 while the other one of the first and second FIFO buffers 142 and 144 are being written with a next video frame data.

Figure 2:
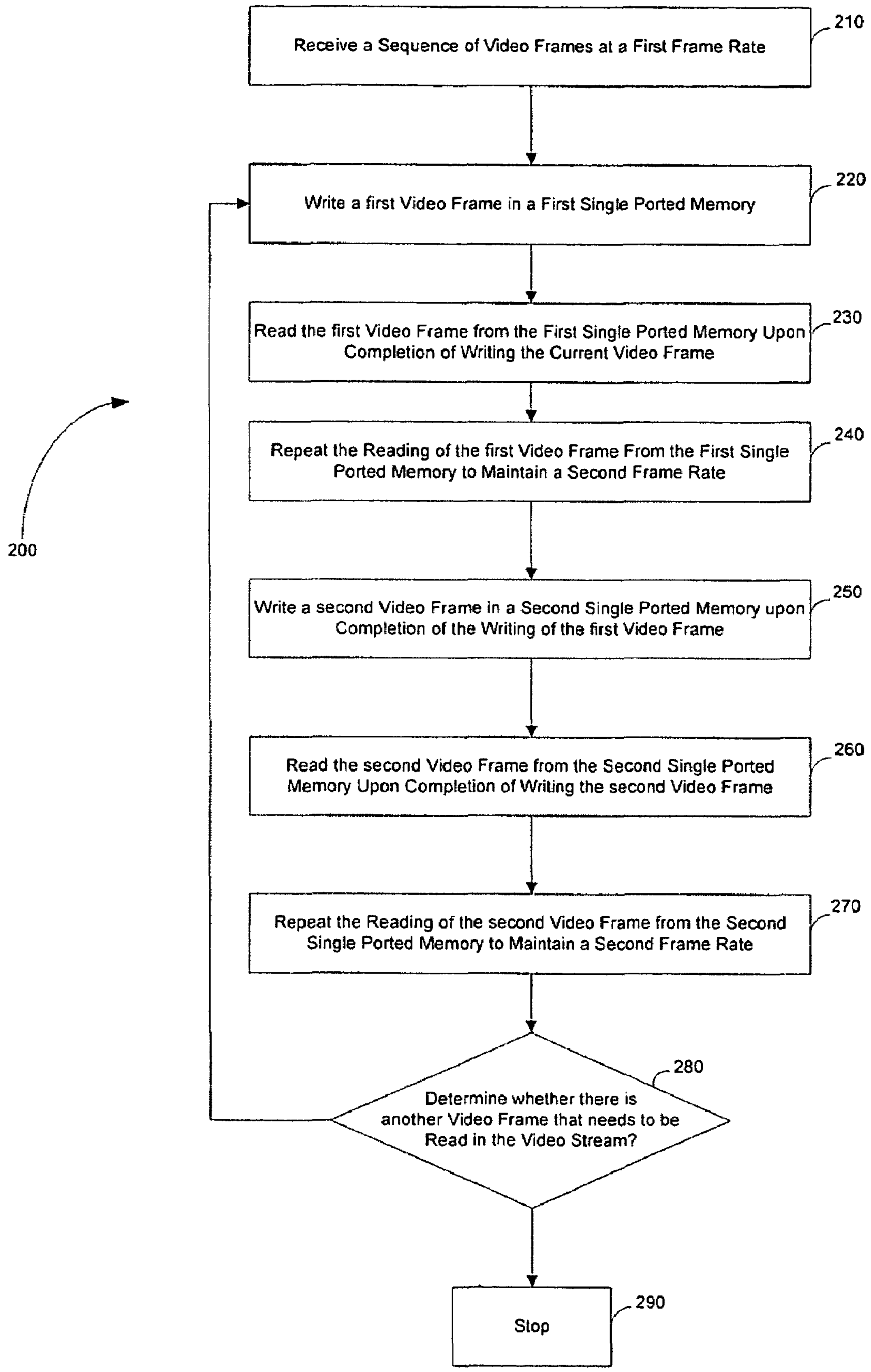
FIG. 2 is a flowchart illustrating an example concurrent read-write operations performed using the display controller of FIG. 1

Referring now to FIG. 2, there is illustrated an example method 200 of concurrent read-write operations performed by a display controller. At 210, this example method, receives a sequence of video frames at a first frame rate. In some embodiments, the sequence of video frames are received at a first variable frame rate. In other embodiments, the sequence of video frames is received at a fixed frame rate.

At 220, a first video frame is written in a first single ported memory. At 230, the first video frame is read from the first single-ported memory upon completing the writing of the first video frame in the first single-ported memory. At 240, the reading of the first video frame from the first single-ported memory is repeated to maintain a second frame rate. In these embodiments, the second frame rate is higher than the first frame rate.

At 250, a second video frame is written in a second single-ported memory upon completing the writing of the first video frame in the first single-ported memory such that the writing of the first video frame and the second video frame is at the first frame rate. At 260, the second video frame is read from the second single-ported memory upon completing the writing of the second video frame in the second ported memory. At 270, the reading of the second video frame from the second single-ported memory is repeated to maintain the second frame rate.

At 280, the method 200 determines whether there is another video frame that needs to be read in the received sequence of video frames. Based on the determination at 280, the method 200 goes to step 220 and repeats steps 220-280, if there is another video frame that needs to be read in the received sequence of video frames. Based on the determination at 280, the method 200 goes to step 290 and stops, if there is no other video frame that needs to be read in the received sequence of video frames. The operation of converting incoming video frame at a lower rate to a higher rate is explained in more detail with reference to FIG. 1.

Various embodiments of the present invention can be implemented indifferent forms of hardware such as with discrete logic ICs, Application Specific Integrated Circuits (ASICs), FPGAs, Erasable Programmable Logic Devices (EPLDs) and/or Complex Programmable Logic Devices (CPLD), which may be used in the environment shown in FIG. 3 (to be described below) or in any other suitable computing environment. The embodiments of the present invention are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, Digital Signal Processors, set-top boxes, projectors, wireless projectors, programmable consumer electronics, network computers, minicomputers, mainframe computers, distributed computing environments and the like to execute code stored on a computer-readable medium.

Figure 3:
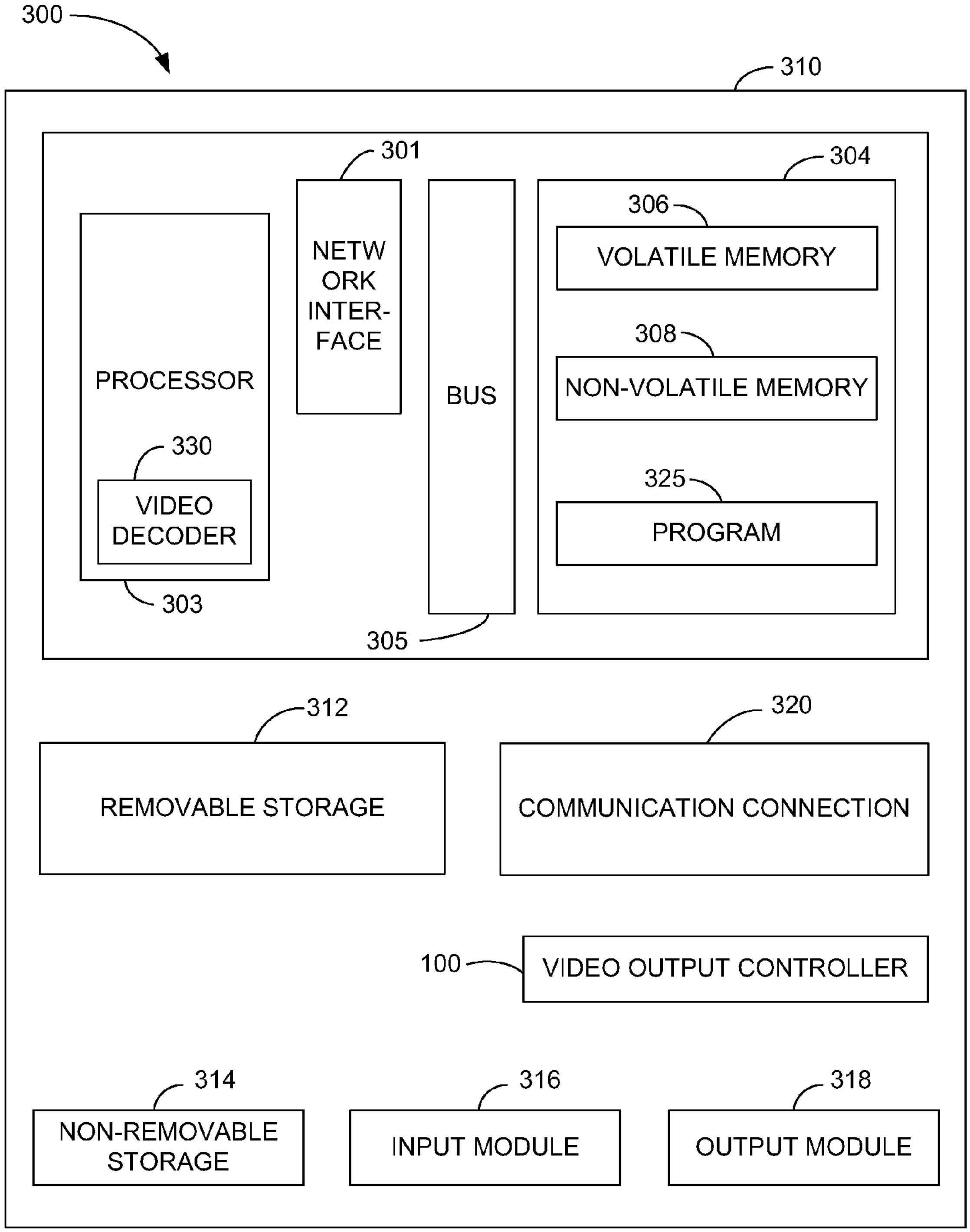
FIG. 3 is a schematic block diagram of a system that can be used to run some or all portions of the present invention.

FIG. 3 shows an example of a suitable computing system environment for implementing embodiments of the present invention. FIG. 3 and the following discussion are intended to provide a brief, general description of a suitable computing environment in which certain embodiments of the inventive concepts contained herein may be implemented.

A general computing device, in the form of a computer 310, may include a processor 303, memory 304, removable storage 312, and non-removable storage 314. Computer 310 additionally includes a bus 305 and a network interface (NI) 301 and a video output controller 335. The processor 303 may include a video decoder 330 that serves to decompress the compressed video signal. The video output controller 335 could be a part of the motherboard or be implemented as an add-on board.

The computer 310 may include or have access to a computing environment that includes one or more user input devices 316 and one or more output devices 318. The user input device 316 can include a keyboard, mouse, trackball, cursor detection keys, and/or the like. The output device 318 can include a computer display device, projector and the like. The network interface 301 can be a USB connection, a 10 Mbps Ethernet connection, a 10/100 Mbps Ethernet connection, a WLAN connection, and/or a Gigabit Ethernet connection. The computer 310 may operate in a networked environment using the network interface 301 to connect to one or more remote computers via Internet. The remote computer may include a personal computer, server, router, network PC, a peer device or other network node, and/or the like. The network interface 301 can also connect to a Local Area Network (LAN), a Wide Area Network (WAN), and/or other networks. The video frames processed by the Video Output Controller could be streamed through the Network Interface 301 from a remote computer or other such device.

The memory 304 may include volatile memory 306 and non-volatile memory 308. The volatile memory 306 stores video frames. A variety of computer-readable media may be stored in and accessed from the memory elements of computer 310, such as volatile memory 306 and non-volatile memory 308, removable storage 313 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard disk drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a Digital Signal Processor (DSP), or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Referring now to FIGS. 1 and 3, in operation, a sequence of video frames are received by the processing unit 303 via the network interface 301. Further, the source interface module 110 receives the sequence of video frames from the processing unit 303. Each video frame includes video data. The control logic circuit 155 controls reading of the received video frames from the source interface module 110 and writes the read video frames to the first and second single-ported memories 120 and 130 at a first frame rate. The control logic circuit 155 further controls reading of the video frames from the first and second single-ported memories and writes the read video frames to the output interface module 140 at a second frame rate. The first frame rate is lower than the second frame rate.

The operation of the display controller that converts the sequence of video frames coming at a lower frame rate to a higher frame rate is explained in more detail with reference to FIGS. 1 and 2.

It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present invention can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 3 can be performed in a different order from those shown and described herein.

FIGS. 1 and 3 are merely representational and are not drawn to scale. Certain portions thereof may be exaggerated, while others may be minimized. FIGS. 1-3 illustrate various embodiments of the invention that can be understood and appropriately carried out by those of ordinary skill in the art.

It is emphasized that the Abstract is provided to comply with 37 C.F.R. § 1.73(b) requiring an Abstract that will allow the reader to quickly ascertain the nature and gist of the technical disclosure. It is submitted with the understanding that it will not be used to interpret or limit the scope or meaning of the claims.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein,” respectively.

What is claimed is:

1. An apparatus for high rate concurrent read-write applications, comprising:

a source interface module that receives video frames at a first frame rate, wherein each video frame has video data;

first and second single-ported memories coupled to the source interface module;

a control logic circuit coupled to the source interface module and the first and second single-ported memories; and an output interface module coupled to the control logic circuit and the first and second single-ported memories, wherein the control logic circuit controls reading of the video frames from the source interface module and writing of the read video frames to the first and second single-ported memories at the first frame rate, and wherein the first frame rate is lower than a second frame rate, wherein the control logic circuit controls reading of the video frames from the first and second single-ported memories and writing of the read video frames to the output interface module at the second frame rate, wherein the first variable frame rate is lower than the second frame rate, and wherein the control logic circuit switches the roles of the first and second single-ported memories, by switching the single ported memory that has finished writing a complete video frame from the source interface module to a read mode to be performed by the output interface module and by switching the other single-ported memory from which the output interface module has finished reading a complete video frame to a write mode to be performed by the source interface module.

2. The apparatus of claim 1, wherein the control logic circuit controls writing of a current video frame to the output interface module at the second frame rate by repeating the writing of the current video frame by R times, wherein R is a repetition ratio, and wherein R is computed using the equation:

$$\text{Repetition ratio } R=(\text{second frame rate}/\text{first frame rate}).$$

3. The apparatus of claim 2, wherein each video frame comprises video data, and wherein video data comprises multiple bytes.

4. The apparatus of claim 3, wherein the source interface module comprises first and second buffer memories capable of storing a predetermined number of words, wherein the control logic circuit controls writing the received video data by the source interface module to the first and second buffer memories such that while writing the predetermined number of words to one of the first and second buffer memories the other of one of the first and second buffer memories is being read by the one of the first and second single-ported memories at the first variable frame rate.

5. The apparatus of claim 1, wherein the output interface module comprises first and second FIFO buffers, wherein upon completion of writing the current video frame in either one of the first and second single-ported memories the written video frame is read into one of the first and second FIFO buffers on a line-by-line basis.

6. The apparatus of claim 1, further comprising a sync generator that generates a Hsync (horizontal synchronization) signal and a Vsync (vertical synchronization) signal, wherein the generated Hsync signal and the Vsync signal define boundaries of a video line and a video frame, respectively.

7. The apparatus of claim 1, further comprising a display device that receives the outputted video frame data along with the Hsync signal and the Vsync signal and displays the video frame data.

8. The apparatus of claim 1, wherein the single-ported memories are selected from the group the comprising of SDRAM (Synchronous Dynamic Random Access Memory) and SRAM (Static Random Access Memory).

9. The apparatus of claim 1, wherein the first frame rate is selected from the group comprising of a first variable frame rate and a first fixed frame rate.

10. A system for high rate concurrent read-write applications, comprising:

a network interface;

a processing unit coupled to the network interface, wherein the processing unit comprising:

a video decoder to receive a sequence of video frames via the network interface, wherein the video decoder comprises;

a source interface module that receives the sequence of video frames at a first frame rate from the processing unit, wherein each video frame has video data;

first and second single-ported memories coupled to the source interface module;

a control logic circuit coupled to the source interface module and the first and second single-ported memories; and an output interface module coupled to the control logic circuit and the first and second single-ported memories, wherein the control logic circuit controls reading of the video frames from the source interface module and writing of the read video frames to the first and second single-ported memories at the first frame rate, wherein the control logic circuit controls reading of the video frames from the first and second single-ported memories and writing of the read video frames to the output interface module at a second frame rate, wherein the first frame rate is lower than the second frame rate, and wherein the control logic circuit switches the roles of the first and second single-ported memories, by switching the single ported memory that has finished writing a complete video frame from the source interface module to a read mode to be performed by the output interface module and by switching the other single-ported memory from which the output interface module has finished reading a complete video frame to a write mode to be performed by the source interface module.

11. The system of claim 10, wherein the control logic circuit controls writing of a current video frame to the output interface module at the second frame rate by repeating the writing of the current video frame by R times, wherein R is a repetition ratio, and wherein R is computed using the equation:

Repetition ratio $R$=(second frame rate/first frame rate).

12. The system of claim 11, wherein the single-ported memories are selected from the group the comprising of SDRAM and SRAM.

13. A method for high rate concurrent read-write applications, comprising:

receiving a sequence of video frames at a first variable frame rate from a source interface module;

writing a first video frame in a first single-ported memory using a control logic circuit;

reading the first video frame from the first single-ported memory upon completing the writing of the first video frame in the first single-ported memory using the control logic circuit;

repeating the reading of the first video frame from the first single-ported memory to maintain a second frame rate using the control logic circuit, wherein the second frame rate is higher than the first variable frame rate;

writing a second video frame in a second single-ported memory upon completing the writing of the first video frame in the first single-ported memory using the control logic circuit such that the writing of the first video frame and the second video frame is at the first variable frame rate;

reading the second video frame from the second single-ported memory upon completing the writing of the second video frame in the second single-ported memory to an output source interface module; and repeating the reading of the second video frame from the second single-ported memory to maintain the second frame rate, wherein the control logic circuit switches the roles of the first and second single-ported memories, by switching the single ported memory that has finished writing a complete video frame from the source interface module to a read mode to be performed by the output interface module and by switching the other single-ported memory from which the output interface module has finished reading a complete video frame to a write mode to be performed by the source interface module.

14. The method of claim 13, further comprising: repeating the above steps for the subsequent video frames.

15. The method of claim 13, wherein, in writing the current video frame in the first single-ported memory and writing the next video frame in the second single-ported memory, the first and second single-ported memories comprises memories selected from the group consisting of SDRAMs and SRAMs.

16. A method for high rate concurrent read-write applications, comprising:

receiving a sequence of video frames at a first frame rate from a source interface module;

writing a first video frame in a first single-ported memory using a control logic circuit;

reading the first video frame from the first single-ported memory upon completing the writing of the first video frame in the first single-ported memory using the control logic circuit;

repeating the reading of the first video frame from the first single-ported memory to maintain a second frame rate using the control logic circuit, wherein the second frame rate is higher than the first frame rate;

writing a second video frame in a second single-ported memory upon completing the writing of the first video frame in the first single-ported memory using the control logic circuit such that the writing of the first video frame and the second video frame is at the first frame rate;

reading the second video frame from the second single-ported memory upon completing the writing of the second video frame in the second single-ported memory to an output source interface module; and repeating the reading of the second video frame from the second single-ported memory to maintain the second frame rate, wherein the control logic circuit switches the roles of the first and second single-ported memories, by switching the single ported memory that has finished writing a complete video frame from the source interface module to a read mode to be performed by the output interface module and by switching the other single-ported memory from which the output interface module has finished reading a complete video frame to a write mode to be performed by the source interface module.

17. The method of claim 16, further comprising:

repeating the above steps for the subsequent video frames.

18. The method of claim 17, wherein, in writing the current video frame in the first single-ported memory and writing the next video frame in the second single-ported memory, the first and second single-ported memories comprise memories selected from the group consisting of SDRAMs and SRAMs.

* * * * *